United States Patent [19]

Campbell, Jr. et al.

[11] Patent Number: 5,141,708
[45] Date of Patent: Aug. 25, 1992

[54] FLUIDIZED BED COMBUSTION SYSTEM AND METHOD HAVING AN INTEGRATED RECYCLE HEAT EXCHANGER

[75] Inventors: Walter R. Campbell, Jr., Union; Michael G. Alliston, Denville; Benjamin H. Sisson, Phillipsburg, all of N.J.

[73] Assignee: Foster Wheeler Energy Corporation, Clinton, N.J.

[21] Appl. No.: 632,634

[22] Filed: Dec. 26, 1990

Related U.S. Application Data

[63] Continuation of Ser. No. 371,170, Jun. 26, 1989, abandoned, which is a continuation-in-part of Ser. No. 135,814, Dec. 21, 1987, abandoned.

[51] Int. Cl.⁵ ............... F27B 15/00; B01J 8/26; B01J 8/36
[52] U.S. Cl. ............... 422/142; 110/245; 122/4 D; 165/104.16; 422/141; 422/145; 422/146; 422/147; 431/7; 431/170
[58] Field of Search ............... 422/141-143, 422/145-147; 110/245, 263, 345, 347; 122/4 D; 431/7, 170; 165/104-116

[56] References Cited

U.S. PATENT DOCUMENTS

| | | | |
|---|---|---|---|
| 2,665,971 | 1/1954 | Lewis et al. | 422/140 X |
| 3,236,607 | 2/1966 | Porter, Jr. et al. | 422/141 |
| 3,851,406 | 12/1974 | Dumitru et al. | 34/57 R |
| 3,893,426 | 7/1975 | Bryers | 122/4 D |
| 4,080,181 | 3/1978 | Feistel et al. | 48/99 |
| 4,111,158 | 9/1978 | Reh et al. | 122/4 D |
| 4,165,717 | 8/1979 | Reh et al. | 122/4 D |
| 4,227,488 | 10/1980 | Stewart et al. | 122/4 D |
| 4,338,283 | 7/1982 | Sakamoto et al. | 422/141 X |
| 4,459,133 | 7/1984 | Moss | 34/57 A X |
| 4,469,050 | 9/1984 | Korenberg | 110/245 X |
| 4,548,138 | 10/1985 | Korenberg | 110/245 |
| 4,594,967 | 6/1986 | Wolowodiuk | 122/4 D |
| 4,617,877 | 10/1986 | Gamble | 122/4 D |
| 4,665,864 | 5/1987 | Seshamani et al. | 122/4 D |
| 4,682,567 | 7/1987 | Garcia-Mallol et al. | |
| 4,686,939 | 8/1987 | Stromberg | 122/4 D X |
| 4,694,758 | 9/1987 | Gorzegno et al. | 122/4 D X |
| 4,704,084 | 11/1987 | Liu et al. | 122/4 D X |
| 4,709,662 | 12/1987 | Rawdon | 122/4 D |
| 4,716,856 | 1/1988 | Beisswenger et al. | 122/4 D |
| 4,761,131 | 8/1988 | Abdulally | 122/4 D X |
| 4,813,479 | 3/1989 | Wahlgren | 165/104.16 |
| 4,856,460 | 8/1989 | Wied et al. | 110/245 X |
| 4,896,717 | 1/1990 | Campbell, Jr. et al. | 122/4 D X |
| 4,947,804 | 8/1990 | Abdulally | 122/4 D |
| 4,969,930 | 11/1990 | Arpalahti | 122/4 D X |

Primary Examiner—Robert J. Warden
Assistant Examiner—Amalia L. Santiago
Attorney, Agent, or Firm—Marvin A. Naigur

[57] ABSTRACT

A fluidized bed combustion system and method in which a recycle heat exchanger is located adjacent the furnace section of the combustion system. A mixture of flue gases and entrained particulate materials from a fluidized bed in the furnace section are separated and the flue gases are passed to a heat recovery section and the separated particulate material to the fluidized bed in the recycle heat exchanger. A first chamber and plurality of additional chambers are formed in the recycle heat exchanger. A particulate material is supported in all of the additional chambers and air is introduced to each of the additional chambers to fluidize the material. The separated particulate material from the fluidized bed in the furnace section is introduced into one of the chambers and the chambers communicate to permit the material to flow between the chambers. Upon exceeding a predetermined height, the material flows from the other additional chambers to the first chamber before discharging to the fluidized bed in the furnace section.

11 Claims, 2 Drawing Sheets

FLUIDIZED BED COMBUSTION SYSTEM AND METHOD HAVING AN INTEGRATED RECYCLE HEAT EXCHANGER

CROSS REFERENCE TO RELATED APPLICATION

This is a continuation of co-pending application Ser. No. 341,170 filed on Jun. 26, 1989 now abandoned, which, in turn, is a continuation-in-part of abandoned application Ser. No. 135,814 filed Dec. 21, 1987.

BACKGROUND OF THE INVENTION

This invention relates to a fluidized bed combustion system and a method of operating same and, more particularly, to such a system and method in which a recycle heat exchanger is formed integrally with the furnace section of the system.

Fluidized bed combustion systems are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. Water is passed in a heat exchange relationship to the fluidized bed to generate steam. The combustion system includes a separator which separates the entrained particulate solids from the gases from the fluidized bed in the furnace section and recycles them back into the bed. This results in an attractive combination of high combustion efficiency, high sulfur adsorption, low nitrogen oxides emissions and fuel flexibility.

The most typical fluidized bed utilized in the furnace section of these type systems is commonly referred to as a "bubbling" fluidized bed in which the bed of particulate material has a relatively high density and a well defined, or discrete, upper surface. Other types of fluidized beds utilize a "circulating" fluidized bed. According to this technique, the fluidized bed density may be below that of a typical bubbling fluidized bed, the air velocity is equal to or greater than that of a bubbling bed, and the flue gases passing through the bed entrain a substantial amount of the fine particulate solids to the extent that they are substantially saturated therewith.

Also, circulating fluidized beds are characterized by relatively high solids recycling which makes it insensitive to fuel heat release patterns, thus minimizing temperature variations, and therefore, stabilizing the emissions at a low level. The high solids recycling improves the efficiency of the mechanical device used to separate the gas from the solids for solids recycle, and the resulting increase in sulfur adsorbent and fuel residence times reduces the adsorbent and fuel consumption.

However, several problems do exist in connection with these types of fluidized beds, and more particularly, those of the circulating type. For example, a sealing device such as a seal pot, a syphon seal, or an "L" valve and a hot expansion joint are required between the low pressure cyclone discharge and the higher pressure furnace section of the system, and the transfer of the separated particulate material from the cyclone back to the fluidized bed has to be done by a gravity chute or a pneumatic transport system. The addition of these components add to the cost and complexity of the system. Also in these types of systems the particulate material recycled from the cyclone to the fluidized bed has to be at a fairly precise temperature. This requires an increased furnace height or the installation of wear-prone surfaces in the upper furnace to cool the particulate material before being reinjected into the fluidized bed to the appropriate temperature. Alternatively, heat may be removed from the recycled solids by submerging cooling surfaces in a second fluidized bed situated between the collector outlet and the return point to the main fluidized bed. A unit of this type, termed a recycle heat exchanger, has the advantage of very high heat transfer rates. As with any fluid bed heat exchanger, the simplest method of controlling the amount of heat transfer accomplished would be by varying the level of solids in the recycle heat exchanger.

Situations exist in which a sufficient degree of freedom in choosing the recycle bed height is not available, such as for example, when a minimum fluidized bed solids depth or pressure is required for reasons unrelated to heat transfer. In this case, the heat transfer may be controlled by diverting a portion of the particulate material so it does not contact and become cooled by the recycle heat exchanger. When the correct portions of cooled and uncooled material are subsequently recombined, the desired final material temperature may be obtained. For example, different type valves, such as "plug valves" and "L valves," have been used to bleed a portion of the solids passing through the bed and/or to directly control the flow rates from both a heat exchanger bed and a material-pressure control bed. However, these type arrangements require the use of moving parts within the solids system and/or need solids flow conduits with associated aeration equipment.

SUMMARY OF THE INVENTION

It is therefore an object of the present invention to provide a fluidized bed combustion system and method which overcomes the aforementioned disadvantages of previous techniques.

It is a further object of the present invention to provide a system and method of the above type which eliminates the need for pneumatic transport devices between the separator and the furnace section of the reactor.

It is a further object of the present invention to provide a system and method of the above type in which the height of the furnace section of the reactor is reduced and the need for wear-prone surfaces in the upper furnace section is eliminated.

It is a further object of the present invention to provide a system and method of the above type in which radiant superheater and/or reheater surfaces in the upper portion of the furnace are eliminated.

It is a further object of the present invention to provide a system and method of the above type in which the efficiency of the heat exchange surfaces is increased.

It is a further object of the present invention to provide a system and method of the above type in which optimum bed temperatures are achieved.

It is a further object of the present invention to provide a system and method of the above type in which the amount of heat extracted from the fluidized bed is controlled without having to vary the quantity of heat exchange surface that is immersed in the fluidized bed.

It is a further object of the present invention to provide a system and method of the above type in which the heat extraction rate is controlled by diverting a portion or all of the materials from the heat exchanger without the problems normally associated therewith.

It is a further object of the present invention to provide a system and method of the above type in which the rate of heat extracted from the fluidized bed is controlled by bypassing a portion or all of the particulate material away from the heat exchanger and subsequently recombining it with the portion in contact with the heat exchanger.

It is a further object of the present invention to provide a system and method of the above type in which a plurality of separate fluidized beds are provided within the heat exchanger vessel, one or more of which is provided with heat exchange surface and the others of which are used to control the quantity of the particulate material exposed to the heat exchange surface.

Toward the fulfillment of these and other objects, the system of the present invention includes a recycle heat exchanger located adjacent the steam generating section of the system. The flue gases and entrained particulate materials from the fluidized bed in the furnace of the steam generating section are separated and the flue gases are passed to the heat recovery area and the separated particulate material is passed to the recycle heat exchanger. The recycle heat exchanger includes a first chamber for receiving the solids discharged from the separators and includes a plurality of additional chambers. The solids are introduced to one of the additional chambers and permitted to flow to the other additional chambers where they are fluidized. Heat exchange surfaces are provided in one or more of the additional chambers for extracting heat from the fluidized bed therein. The solids in the additional chambers are permitted to flow into the first chamber when the level in the additional chambers exceeds a predetermined height. The solids entering the first chamber are discharged from the housing to the fluidized bed in the furnace of the steam generating section.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing wherein.

DESCRIPTION OF THE PREFERRED EMBODIMENT

Figure 1:
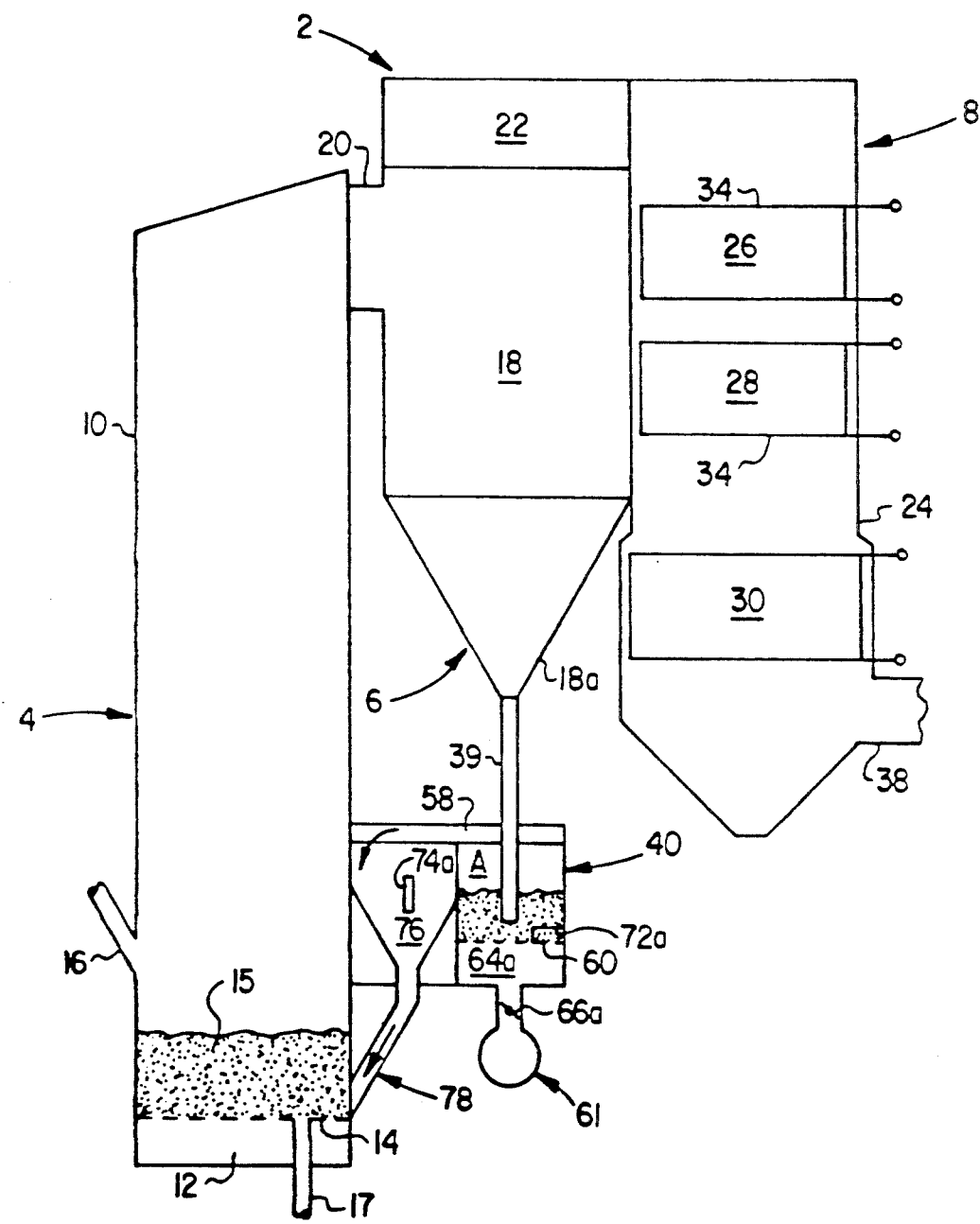
FIG. 1 is a schematic representation depicting the system of the present invention.
Figure 2:
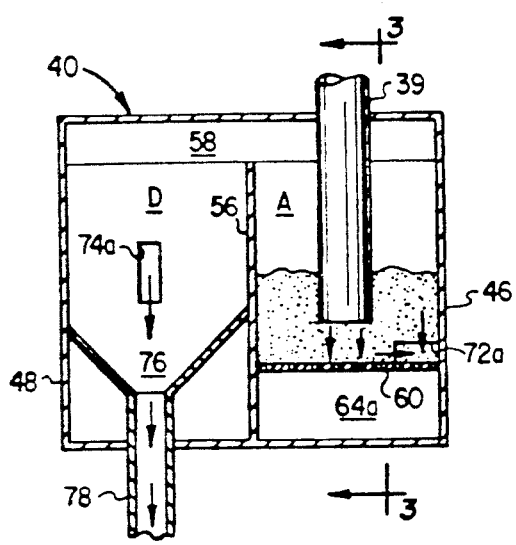
FIG. 2 is a sectional view of the fluidized bed recycle heat exchanger of the present invention.
Figure 3:
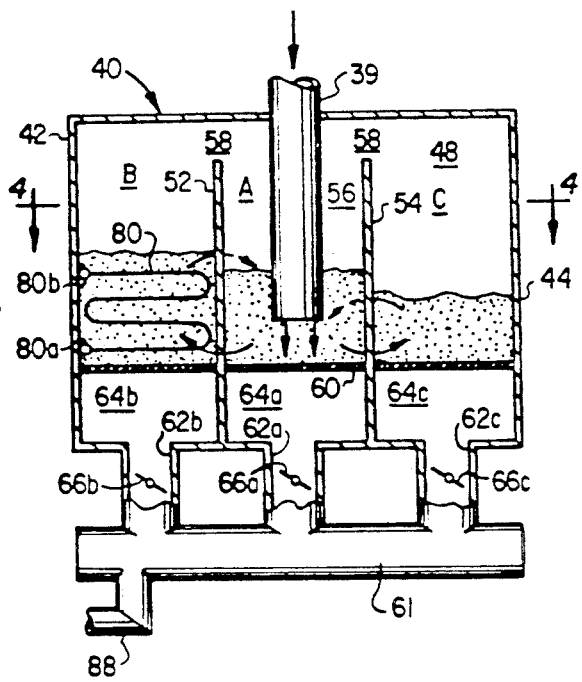
FIG. 3 is a cross-sectional view taken along the line 3—3 of FIG. 2.
Figure 4:
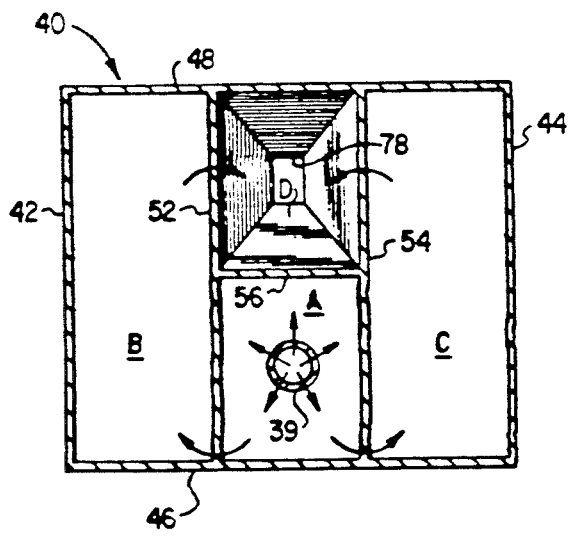
FIG. 4 is a top plan view of the heat exchanger of FIG. 2.

Referring specifically to FIG. 1 of the drawings, the reference numeral 2 refers, in general, to the fluidized bed combustion system of the present invention which includes a furnace section 4, a separating section 6, and a heat recovery area 8. The furnace section 4 includes an upright enclosure 10 and an air plenum 12 disposed at the lower end portion of the enclosure for receiving air from an external source. An air distributor 14 is provided at the interface between the lower end of the enclosure 10 and the air plenum 12 for allowing the pressurized air from the plenum to pass upwardly through the enclosure 10.

A bed 15 of particulate material is supported on the air distributor 14 and one or more inlets 16 are provided through the walls of the enclosure 10 for introducing a particulate material into the bed, and a drain pipe 17 registers with an opening in the air distributor 14 and/or walls of the enclosure 10 for discharging spent particulate material from the bed 15. The particulate material can include coal and relatively fine particles of an adsorbent material, such as limestone, for adsorbing the sulfur generated during the combustion of the coal, in a known manner. The air from the plenum 12 fluidizes the particulate material in the bed 15.

It is understood that the walls of the enclosure 10 include a plurality of water tubes disposed in a vertically extending relationship and that flow circuitry (not shown) is provided to pass water through the tubes to convert the water to steam. Since the construction of the walls of the enclosure 10 is conventional, the walls will not be described in any further detail.

The separating section 6 includes one or more cyclone separators 18 provided adjacent the enclosure 10 and connected thereto by ducts 20 which extend from openings formed in the upper portion of the rear wall of the enclosure 10 to inlet openings formed in the upper portion of the separators 18. The separators 18 receive the flue gases and entrained particulate material from the fluidized bed 15 in the enclosure 10 and operate in a conventional manner to disengage the particulate material from the flue gases due to the centrifugal forces created in the separator. The separated flue gases pass, via ducts 22, into and through the heat recovery area 8.

The heat recovery area 8 includes an enclosure 24 housing superheater 26, a reheater 28 and an economizer 30, all of which are formed by a plurality of heat exchange tubes 34 extending in the path of the gases that pass through the enclosure 24. The superheater 26, the reheater 28 and the economizer 30 all are connected to fluid flow circuitry (not shown) extending from the tubes forming the walls of the furnace section 4 to receive heated water or vapor for further heating. It is understood that the tubes 34 are formed in bundles, in a conventional manner. After passing through the superheater 26, the reheater 28 and the economizer 30, the gases exit the enclosure 24 through an outlet 38 formed in the rear wall thereof.

The separated solids from the separator 18 pass into a hopper 18a connected to the lower end of the separator and then into a dipleg 39 connected to the outlet of the hopper. The dipleg 39 extends into a recycle heat exchanger shown in general by the reference numeral 40 and more specifically with reference to FIGS. 2-5.

The heat exchanger 40 includes a vessel, or housing, formed by four walls 42, 44, 46 and 48. Although not shown in the drawings for convenience of presentation, it is understood that all of the walls 42, 44, 46 and 48 can be formed by a plurality of spaced vertical tubes connected together by diametrically opposed fins extending therefrom in a conventional manner.

A pair of spaced, parallel partitions 52 and 54 extend between the side walls 46 and 48, and a partition 56 (FIGS. 3 and 4) extends between the partitions 52 and 54 to divide the housing into four chambers, A, B, C, and D. Chamber D extends immediately behind chamber A, and chambers B and C extend to the sides of chambers A and D as better shown in FIG. 4. The height of the partition walls 52, 54 and 56 is less than the height of the housing to form outlet openings 58 at the upper portion of the partition walls 52, 54 and 56 for permitting gases to pass from the reactor, into chamber D.

An air distributor 60 extends horizontally in the lower portion of the housing between the walls defining the chambers A, B and C. An air conduit 61 is disposed below the lower end of the housing and communicates with three ducts 62a, 62b and 62c which distribute air into three plenums 64a, 64b and 64c disposed immediately below the air distributor 60 below the chambers A, B and C, respectively.

Control dampers 66a, 66b and 66c are disposed in the ducts 62a, 62b and 62c, respectively, to control the flow of air from the conduit 61 into the air plenums 64a, 64b and 64c and therefore into the chambers A, B, and C, respectively.

The dipleg 39 from the separating section 6 of FIG. 1 extends into and through chamber A, with its outlet end portion extending just above the air distributor 60. Particulate material can thus be continuously fed into chamber A via the dipleg 39. It is understood that an additional particulate material can be introduced to the chambers A, B, C and D in a similar manner via other feeders (not shown).

Figure 5:
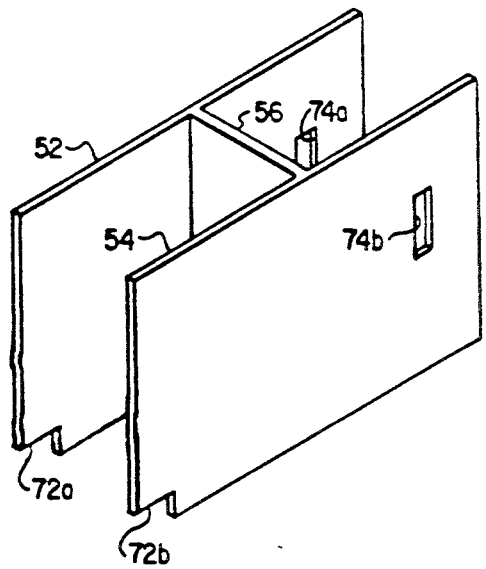
FIG. 5 is an enlarged, partial, perspective view depicting the partitions utilized in the heat exchanger of FIG. 2.

As better shown in FIG. 5, the lower portions of those portions of the partitions 52 and 54 defining the chamber A have openings, or notches 72a and 72b, respectively, formed therethrough to permit the hot particulate material to flow from the chamber A into the chambers B and C.

A pair of weir type openings 74a and 74b are provided in those portions of the partitions 52 and 54 which define the chamber D to permit the particulate material in the chambers B and C to overflow into the chamber D when the buildup of particulate materials in chambers B and C exceeds a predetermined height. A hopper portion 76 is provided in the lower portion of the chamber D which communicates with an outlet conduit 78 for permitting the hot particulate material and gases in the chamber D to pass from the heat exchanger 40 to the fluidized bed 15 in the furnace section 4.

One or more tube bundles, one tube of which is shown by the reference numeral 80 is disposed in the Chamber B. Each tube bundle 80 has an inlet 80a connected to a source of cooling fluid, such as water or steam, and an outlet 80b for passing the fluid to external equipment after the fluid has passed through the chamber B and thus extracted heat from the fluidized bed in the latter chamber.

Referring to FIG. 1, in operation, particulate fuel material from the inlet 16 is introduced into the enclosure 10 and adsorbent material can also be introduced in a similar manner, as needed. Pressurized air from an external source passes into and through the air plenum 12, through the air distributor 14 and into the bed 15 of particulate material in the enclosure 10 to fluidize the material.

A lightoff burner (not shown), or the like, is provided to ignite the particulate fuel material. When the temperature of the material reaches an acceptably high level, additional fuel from the inlet 16 is discharged into the enclosure 10.

The material in the enclosure 10 is self-combusted by the heat in the furnace section 4 and the mixture of air and gaseous products of combustion (hereinafter referred to as "flue gases") passes upwardly through the enclosure 10 and entrains, or elutriates, the relatively fine particulate material in the enclosure. The velocity of the air introduced, via the air plenum 12, through the air distributor 14 and into the interior of the enclosure 10 is established in accordance with the size of the particulate material in the enclosure 10 so that a circulating fluidized bed is formed, i.e. the particulate material is fluidized to an extent that substantial entrainment or elutriation of the particulate material in the bed is achieved. Thus the flue gases passing into the upper portion of the enclosure 10 are substantially saturated with the particulate material. The saturated flue gases pass to the upper portion of the enclosure 10 and exit through the ducts 20 and pass into the cyclone separators 18. In the separators 18, the solid particulate material is separated from the flue gases and the former passes through the hoppers 18a and is injected, via the dipleqs 39, into the recycle heat exchanger 40. The cleaned flue gases from the separators 18 exit, via the duct 22, to the heat recovery area 8 for passage through the enclosure 24 and across the superheater 26, the reheater 28 and the economizer 30, before exiting through the outlet 38 to external equipment.

Referring to FIGS. 2-5, the control dampers 66a, 66b and 66c associated with the recycle heat exchanger 40 are opened as desired to permit fluidizing air to pass upwardly through the air plenums 64a, 64b and 64c and through the air distributor 60 and into the chambers A, B and C, respectively. The air thus fluidizes the particulate material in the chambers A, B and C, with the velocity of the air and therefore the degree of fluidization and the resultant height of the material in the chambers, being controlled as needed by varying the position of the dampers 66a, 66b and 66c. The particulate material accumulating in the chamber A passes through the notches 72a and 72b in the partitions 52 and 54 respectively, and into the chambers B and C, respectively.

The fluidizinq air for chambers A, B, and C passes to the upper portions of the chambers A, B, and C where it exits through the outlet 58. The particulate material builds up in chambers A, B and C and, when the height of the material exceeds the height of the weir openings 74a and 74b, the material will overflow into the chamber D and exit, via the outlet 78, and pass into the fluidized bed 15 in the furnace section 4.

The velocity of the air entering the chamber A is controlled by the damper 66a to fluidize the particulate material in the bed in chamber A at a value that is considered to be optimum for providing a pressure seal for dipleg 39. The air velocity entering the beds in the chambers B and C is controlled by the dampers 66b and 66c according to heat transfer control requirements. Since the fluidizing velocity in the chambers B and C will usually be different, the material in the chambers B and C will have different densities. Since the particulate material communicates between the chambers A and B and between the chambers A and C through the notches 72a and 72b, the beds will operate at different heights. The exit weirs 74a and 74b will therefore discharge quantities of material from the chambers B and C, respectively, into the chamber D that depend upon the expanded bed heights attained in chambers B and C. In this manner, the fraction of the total material flow that passes through the chambers B and C is controlled by varying the fluidized velocities in the latter beds.

It is thus apparent that several advantages result from the foregoing. The use of sealing devices, and pneumatic transport devices between the cyclone separator solids outlet and the furnace section of the reactor are eliminated. Also, the height of the furnace section of the reactor is reduced and the need for wear-prone surfaces in the upper furnace section is eliminated. Further, the radiant superheater and/or reheater surface in the upper portion of the furnace is eliminated and the efficiency of the downstream heat exchange surfaces is increased. Still further, optimum bed temperatures are achieved.

Also, the heat extraction rate from the fluidized bed in the chamber B of the recycle heat exchanger 40 is controlled by varying the air velocity in the chambers B and C, and the system of the present invention can thus be easily started up since there is an uncooled flow path for the particulate material during startup. Further, the solids exit from the heat exchanger 40 via the conduit 78 while avoiding backflow or backsplashing, while a sufficient height of particulate material in the chamber A is assured to provide a pressure seal for the dipleg 39. Also, the mass of material contained in the beds provides a buffer against flow transients and/or pressure transients.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed combustion system comprising means defining a furnace section; means forming a fluidized bed in said furnace section; separating means for receiving a mixture of flue gases and entrained particulate material from said fluidized bed in said furnace section and separating said entrained particulate material from said flue gases; means defining a heat recovery section in communication with said separating means for receiving said separated flue gases; and a recycle heat exchanger disposed adjacent said furnace section and comprising a housing, means in said housing for dividing said housing into an inlet chamber, an outlet chamber extending adjacent said inlet chamber, and two additional chambers extending along the sides of said inlet chamber and said outlet chamber, heat exchange means disposed in at least one of said two additional chamber, means for passing said separated particulate material from said separating section to said inlet chamber, means for permitting said separated particulate material to flow from said inlet chamber to said at least one additional chamber, means for directing said separated particulate material in said at least one additional chamber across said heat exchange means for cooling said separated particulate material in said at least one additional chamber, means for permitting said cooled separated particulate material to flow from said at least one additional chamber to said outlet chamber, and means connecting said outlet chamber to said furnace section to permit the recycle of said cooled separated particulate material from said outlet chamber to said fluidized bed in said furnace section.

2. The system of claim 1 wherein said outlet chamber and at least one of said two additional chambers each share a common wall with said furnace section.

3. The system of claim 1 wherein said housing dividing means includes a wall extending between said inlet chamber and said outlet chamber.

4. The system of claim 3 wherein said housing dividing means further comprises an additional wall extending between said inlet chamber and one of said additional chambers and extending between said outlet chamber and said one additional chamber.

5. The system of claim 1 wherein said inlet chamber shares a common wall with said outlet chamber and wherein said inlet chamber and said outlet chamber each shares a common wall with a portion of at least one of said two additional chambers.

6. The system of claim 1 further comprising means for introducing air to said inlet chamber and at least one of said two additional chambers to fluidize the particulate material therein.

7. The system of claim 6 wherein said air introducing means comprising an air plenum extending below said inlet chamber and said at least one of said two additional chambers for receiving fluidizing air, and an air distributor extending above said air plenum for supporting said particulate material and distributing air from said plenum through said material in said inlet chamber and said at least one of said two additional chambers.

8. The system of claim 1 wherein said heat exchange means comprises tubes for circulating a fluid disposed in said at least one of said two additional chambers for passing a fluid in a heat exchange relation to the particulate material in said at least one additional chamber to control the temperature of the bed materials passed from said recycle heat exchanger to said furnace section.

9. The system of claim 4 wherein said means for permitting the material to flow from said inlet chamber to said one additional chamber comprises an opening formed in the lower portion of said additional wall.

10. The system of claim 9 wherein said means for permitting the material to flow from said one additional chamber to said outlet chamber comprises an additional opening formed in said additional wall.

11. The system of claim 10 wherein said additional opening is formed in the upper portion of said additional wall so that said material flows from said one additional chamber to said outlet chamber in response to the height of said material in said one additional chamber exceeding a predetermined value.

* * * * *

UNITED STATES PATENT AND TRADEMARK OFFICE
CERTIFICATE OF CORRECTION

PATENT NO. : 5,141,708

DATED : August 25, 1992

INVENTOR(S) : Walter R. Campbell, Jr.; Michael G. Alliston; Benjamin H. Sisson It is certified that error appears in the above-identified patent and that said Letters Patent is hereby corrected as shown below:

Column 5, line 33, change "weir type" to -- weir-type --.

Column 8, line 26, change "comprising" to -- comprises --.

Column 8, line 38, after "at least one" add -- of said two --; change "chamber" to -- chambers --.

Signed and Sealed this

Thirtieth Day of November, 1993

BRUCE LEHMAN

Attest:

*Attesting Officer*                     *Commissioner of Patents and Trademarks*